United States Patent
Krishna et al.

(10) Patent No.: US 9,875,275 B2
(45) Date of Patent: Jan. 23, 2018

(54) EFFICIENT STATE CHANGE SUPPORT FOR HIERARCHICAL DATA MODELS IN A VIRTUALIZED SYSTEM

(71) Applicant: Extreme Networks, Inc., San Jose, CA (US)

(72) Inventors: Nishant Krishna, Gaya (IN); Seetharam V Rao, Bangalore (IN); Prashantkumar S Sthavarmath, Shahapur (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 15/243,273

(22) Filed: Aug. 22, 2016

(65) Prior Publication Data

US 2016/0357810 A1    Dec. 8, 2016

Related U.S. Application Data

(63) Continuation of application No. 14/292,552, filed on May 30, 2014, now Pat. No. 9,424,276.

(51) Int. Cl.
G06F 17/30 (2006.01)

(52) U.S. Cl.
CPC .. *G06F 17/30395* (2013.01); *G06F 17/30174* (2013.01); *G06F 17/30221* (2013.01); *G06F 17/30233* (2013.01); *G06F 17/30368* (2013.01)

(58) Field of Classification Search
None
See application file for complete search history.

(56) References Cited

U.S. PATENT DOCUMENTS

| | | | |
|---|---|---|---|
| 5,519,881 A * | 5/1996 | Yoshida | G06F 7/76 711/151 |
| 6,584,532 B1 | 6/2003 | Francis et al. | |
| 6,757,809 B1 * | 6/2004 | Yoshida | G06F 9/30036 710/307 |
| 7,389,496 B2 * | 6/2008 | Eckhart | G06F 9/4812 710/260 |

(Continued)

FOREIGN PATENT DOCUMENTS

CA    2614059    9/2006

*Primary Examiner* — Hung Le
(74) *Attorney, Agent, or Firm* — Haley Guiliano LLP

(57) ABSTRACT

Methods, systems and computer readable media for efficient state change support for hierarchical data models in a virtualized system are described. In some implementations, the method can include determining a system status including a system-level bit masked word having a plurality of bits, each bit corresponding to a status of a different hierarchical level of the system, and receiving a change notification. The method can also include querying an entity at a lower hierarchy level if a cascaded state change is identified for that entity. The method can further include continuing to query one or more entities in successively lower hierarchy levels so long as a cascaded state change is identified for a corresponding entity in a lower hierarchy level. The method can also include determining the current status for one or more entities having a changed status. Identifying a cascaded state change can include performing a logical exclusive OR operation on a previous status bit masked word and a current status bit masked word of an entity.

7 Claims, 9 Drawing Sheets

(56) References Cited

U.S. PATENT DOCUMENTS

| | | | |
|---|---|---|---|
| 7,596,779 B2* | 9/2009 | Hitchcock | G06F 13/24 710/260 |
| 8,458,127 B1 | 6/2013 | Lorch et al. | |
| 2005/0005089 A1* | 1/2005 | Eckhart | G06F 9/4812 712/244 |
| 2005/0141430 A1 | 6/2005 | Borkowski et al. | |
| 2005/0188140 A1* | 8/2005 | Hitchcock | G06F 13/24 710/260 |
| 2007/0101193 A1* | 5/2007 | Johnson | G06F 1/26 714/25 |
| 2007/0177428 A1 | 8/2007 | Cohen et al. | |

\* cited by examiner

EFFICIENT STATE CHANGE SUPPORT FOR HIERARCHICAL DATA MODELS IN A VIRTUALIZED SYSTEM

CROSS-REFERENCE TO RELATED APPLICATIONS

This application is a continuation of U.S. application Ser. No. 14/292,552 filed May 30, 2014, the disclosure of which is expressly incorporated herein by reference in its entirety.

TECHNICAL FIELD

Embodiments relate generally to computer networks, and more particularly, to methods, systems and computer readable media for efficient state change support for hierarchical data models in a virtualized system.

BACKGROUND

In hierarchical systems, where state changes can be dynamic and frequent, data synchronization from nodes at various levels may be inefficient in terms of time needed to synchronize and amount of data exchanged during synchronization. Some current synchronization methods may query at various levels and then perform matching logic to identify the changes to synchronize. This method of synchronization may be inefficient and time consuming in determining state changes in a hierarchical system. Specifically, in a virtualized cloud environment, e.g., Unified Communications as a Service (UCaaS), Contact Center as a service (CCaaS), Platform as a Service (PaaS), Infrastructure as a Service (IaaS) and Software as a Service (SaaS) with distributed nodes, the complexity of synchronization can increase manyfold, thus possibly delaying the synchronization process considerably.

Also, some existing synchronization solutions synchronize state change across virtualized cloud environments by tree traversal and other top-down traversal algorithms. These existing solutions may be inefficient and result in increased delay in synchronizing the data and determining the overall state of dynamically and frequently changing virtualized hierarchical systems.

Embodiments were conceived in light of the above mentioned needs, problems and/or limitations, among other things.

SUMMARY

One or more embodiments can include methods, systems and computer readable media for efficient state change support for hierarchical data models in a virtualized system. In some implementations, the method can include determining a system status including a system-level bit masked word having a plurality of bits, each bit corresponding to a status of a different hierarchical level of the system, and receiving a change notification. The method can also include querying an entity at a lower hierarchy level if a cascaded state change is identified for that entity. The method can further include continuing to query one or more entities in successively lower hierarchy levels so long as a cascaded state change is identified for a corresponding entity in a lower hierarchy level. The method can also include determining the current status for one or more entities having a changed status. Identifying a cascaded state change can include performing a logical exclusive OR operation on a previous status bit masked word and a current status bit masked word of an entity.

In some implementations, the system status can include a plurality of system-level bit masked words each word corresponding to a different system. Receiving the change notification can include querying the system-level bit masked word (e.g., requesting the status word from a virtualized system and comparing it via XOR to the status word stored in a management system).

Receiving the change notification can include receiving an indication of a new entity in the system. Receiving the change notification can include receiving an indication of a removed entity in the system. Receiving the change notification can include receiving an indication of an alarm in an entity in the system. Receiving the change notification can include receiving a new (e.g., edited or changed) value of an existing entity.

The previous status bit masked word can be stored in a management system and the current status bit masked word can be received from a virtualized system. Receiving a change notification can include receiving a status word as a portion of a heartbeat signal (e.g., a periodically transmitted signal used to indicate a system or sub-system is functioning).

Some implementations can include a system comprising one or more processors configured to perform. The operations can include determining a system status including a system-level bit masked word having a plurality of bits, each bit corresponding to a status of a different hierarchical level of the system. The operations can also include receiving a change notification and querying an entity at a lower hierarchy level if a cascaded state change is identified for that entity. The operations can further include continuing to query one or more entities in successively lower hierarchy levels so long as a cascaded state change is identified for a corresponding entity in a lower hierarchy level, and determining the current status for one or more entities having a changed status. Identifying a cascaded state change can include performing a logical exclusive OR operation on a previous status bit masked word and a current status bit masked word of an entity.

In some implementations, the system status can include a plurality of system-level bit masked words each word corresponding to a different system. Receiving the change notification can include querying the system-level bit masked word.

Receiving the change notification can include receiving an indication of a new entity in the system. Receiving the change notification can include receiving an indication of a removed entity in the system. Receiving the change notification can include receiving an indication of an alarm in an entity in the system. Receiving the change notification can include receiving a new (e.g., edited or changed) value of an existing entity.

The previous status bit masked word can be stored in a management system and the current status bit masked word can be received from a virtualized system. Receiving a change notification can include receiving a status word as a portion of a heartbeat signal.

Some implementations can include a nontransitory computer readable medium having stored thereon software instructions that, when executed by a processor, cause the processor to perform operations. The operations can include determining a system status including a system-level bit masked word having a plurality of bits, each bit corresponding to a status of a different hierarchical level of the system.

The operations can also include receiving a change notification and querying an entity at a lower hierarchy level if a cascaded state change is identified for that entity. The operations can further include continuing to query one or more entities in successively lower hierarchy levels so long as a cascaded state change is identified for a corresponding entity in a lower hierarchy level, and determining the current status for one or more entities having a changed status. Identifying a cascaded state change can include performing a logical exclusive OR operation on a previous status bit masked word and a current status bit masked word of an entity.

In some implementations, the system status can include a plurality of system-level bit masked words each word corresponding to a different system. Receiving the change notification can include querying the system-level bit masked word.

Receiving the change notification can include receiving an indication of a new entity in the system. Receiving the change notification can include receiving an indication of a removed entity in the system. Receiving the change notification can include receiving an indication of an alarm in an entity in the system. Receiving the change notification can include receiving a new (e.g., edited or changed) value of an existing entity.

The previous status bit masked word can be stored in a management system and the current status bit masked word can be received from a virtualized system. Receiving a change notification can include receiving a status word as a portion of a heartbeat signal.

DETAILED DESCRIPTION

Figure 1:
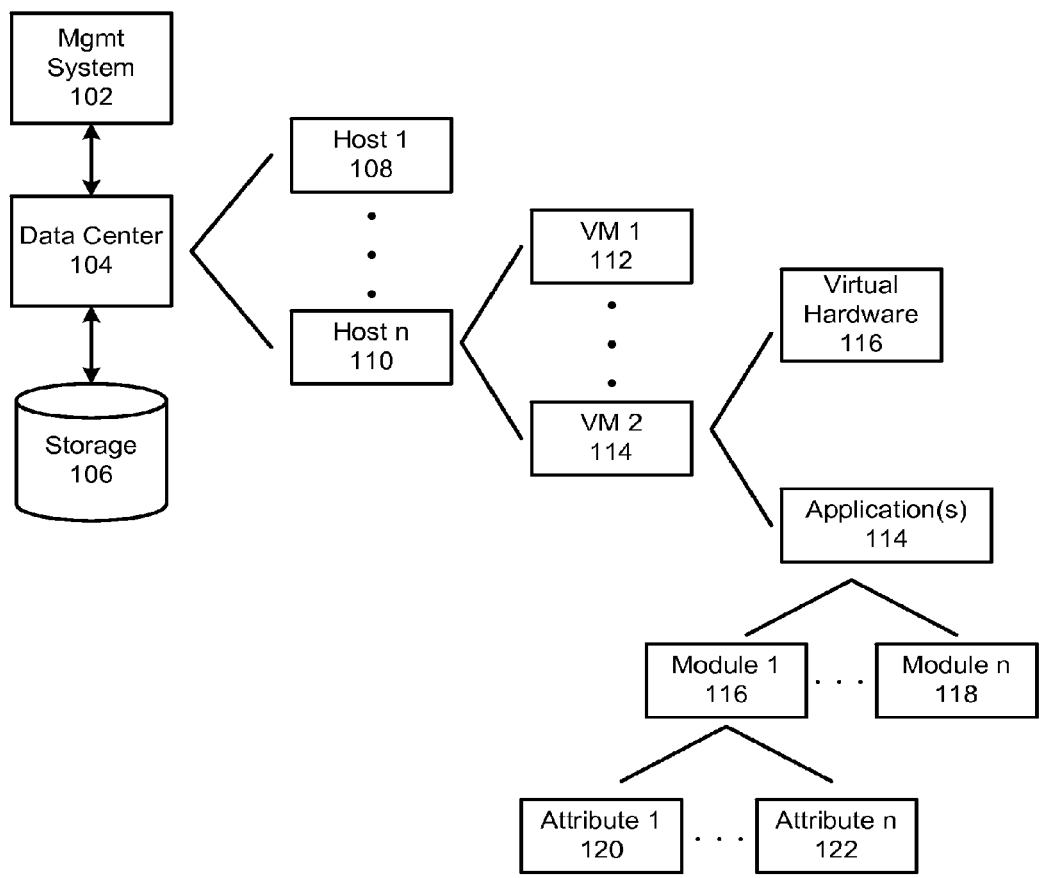
FIG. 1 is a diagram of an example virtualized system having a hierarchical model in accordance with at least one implementation.

In general, some implementations can include a method to perform efficient data synchronization in a virtualized hierarchical cloud environment. It will be appreciated that some implementations can be configured for various kinds of virtualized environments, e.g., private cloud, public cloud, hybrid cloud and the like. Also, some implementations can be configured for hosted environments in which a service provider may give services (e.g., CCaaS, UCaaS, PaaS, and the like) to one or more tenants in a multi-tenant environment. The method can permit a system to identify and reach a required node in the hierarchical data model faster than solutions that traverse from the root node. Thus, the method described herein can result in faster data synchronization and relatively quick identification of a state change in the system.

In some implementations, the state of the hierarchical system is represented as one or more variable-length dynamic bit-masked "words" (e.g., data structure having one or more bits) aggregated at multiple levels. Each bit-mask of the data type (e.g., a bit-masked "word") represents the overall state of the system at that level. Each bit in the bit-mask represents the current state of a sub-system in the level below the level of the bit-mask. A state change is driven bottom up where the bit representing the respective sub-system is toggled and then aggregated at a next higher level. This state change is cascaded to the root level which represents the overall state of the system. This way any aggregate state change is not only readily available at any point in time, it is also easier to identify the sub-system where this state change has occurred and determine relevant information in much less time.

Additionally, this aggregated status can be sent to a management system as a part of heartbeat sync signal. Some implementations can also be configured to identify alarm information on a virtualized system in a standalone or in a cloud based deployment.

Through one or more of the above-mentioned features, the state of entire system is readily available as a bit-masked "word" at any point in time and can be accessed by a remote management server without the need of traversal logic. Data synchronization can be sped up over some existing solutions by identifying the changed sub-system using bit-masks and hence reducing traversal time to reach the required sub-system for querying. Also, the amount of data exchanged as a part of synchronization may be considerably reduced.

Some implementations can include representation of the state of the virtualized hierarchical system using "variable length" dynamic bit masks. Some implementations can aggregate state changes from bottom to top at each level and propagate state changes only if the current state is different than the previous one. Some implementations can include increased efficiency in terms of directly finding out the level at which something has changed in the virtualized system. Each individual entity in a hierarchy can be queried only if a cascaded state change is identified. Some implementations can include XORing of a status hierarchy in the management system with a status hierarchy in the virtualized system to determine if synchronization is needed.

FIG. 1 is a diagram of an example virtualized system environment 100 having a hierarchical model in accordance with at least one implementation. The system environment 100 includes a management system 102, a data center 104 (e.g., a VMware system) and a storage 106. The data center 106 includes a plurality of host computer systems (108, 110). Each host (108, 110) can have a plurality of VMs or virtual machines (112, 114). Each VM (112, 114) can include virtual hardware 116 and run one or more virtual applications 114. Each application 114 can include one or more modules (116, 118), which can each have one or more attributes (120, 122). The virtual hardware 116 can include one or more virtual CPUs, hard disks, memory modules, network interface cards (NICs), CD/DVD drives and/or the like.

In operation, a representation of the entire virtualized system 104 can be dynamically discovered by the management system via traversing the hierarchical levels of the system 104. Status changes at multiple levels of the virtualized system 104 can be aggregated for reporting to the management system. In general, state changes are aggregated at each level from bottom to top of the virtualized system hierarchy. A change notification is only sent to a higher level when the current state of an entity (e.g., host, VM, virtual hardware, application, module, attribute or the like) is different than a previous state of that entity. The process of synchronizing system status between the management system 102 and the virtualized system 104 is described in greater detail below in connection with FIGS. 2-7.

Figure 2:
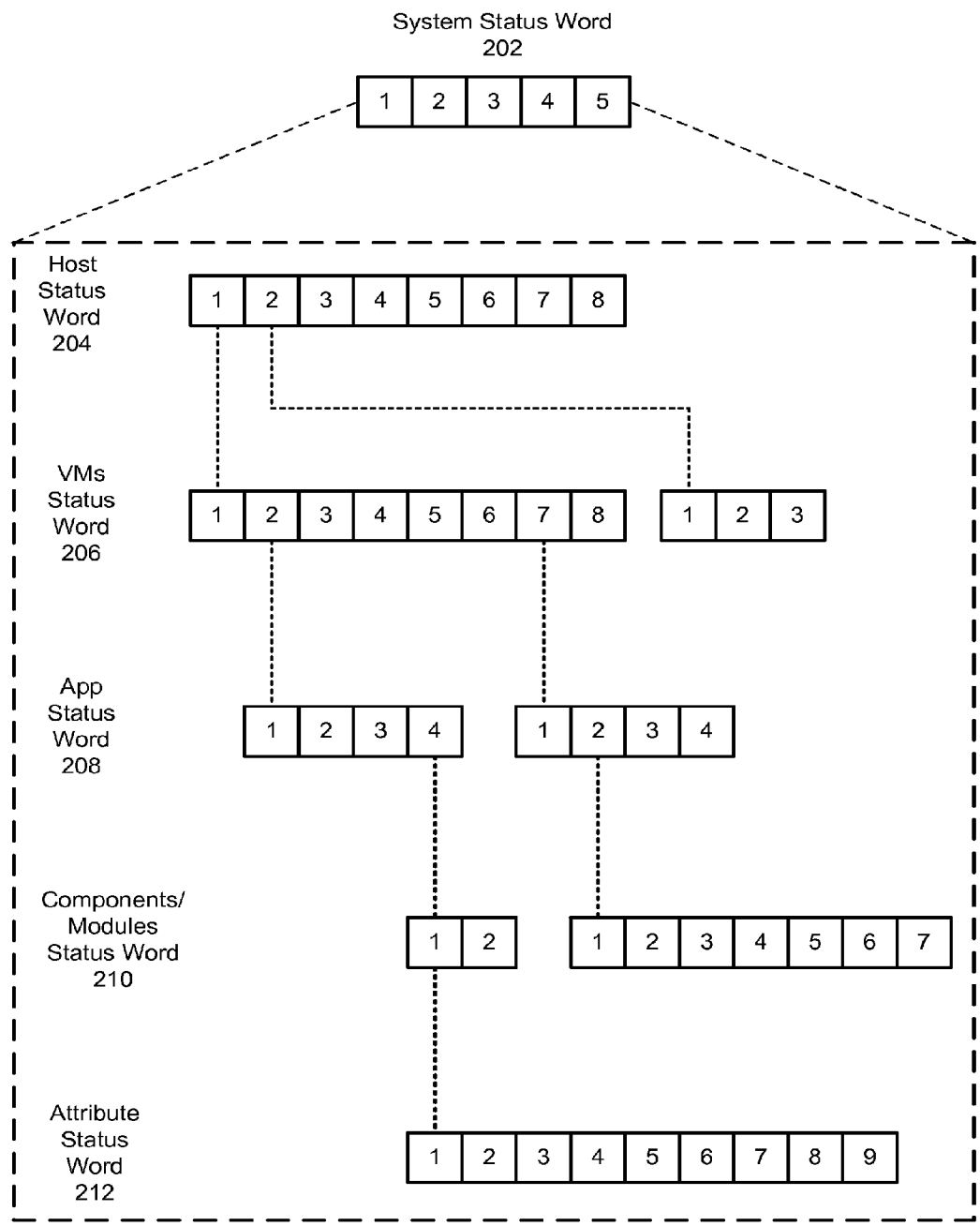
FIG. 2 is a diagram of an example multiple level variable-length dynamic bit-masked status words in accordance with at least one implementation.

FIG. 2 is a diagram of example multiple level variable-length dynamic bit-masked status words in accordance with at least one implementation. In the system-level bit masked status word 202, a bit is kept separately for each hierarchical level (e.g., host, VM, virtual hardware, application, module, and attribute) within a virtualized system (e.g., 104). By querying the system-level status word, a management system (e.g., 102) can determine if a status change (e.g., state change, alarm, new entity, removed entity or the like) has occurred and at what level in the hierarchy the change has occurred. Thus, the management system can determine which levels have a change.

In addition to a system level status word 202, an implementation can include a host status word 204, one or more VM status words 206, one or more application status words 208, one or more component/module status words 210, and one or more attribute status words 210.

Each bit in the status words represents the presence/absence of an alarm (or other status indication). For example, assume a state change from a bit value of "0" to a bit value of "1" in the ninth bit of the attribute status word. This change would be aggregated and cascaded to the next higher level, which is the component status word level 210. The first bit of the component status word having only two bits would be updated to reflect the change. This change in component status word value would then, in turn be cascaded up to the application level 208 and result in a bit change in the fourth bit position of the first application status word. This application status change would then be aggregated and cascaded up to the VM level 206 and cause the second bit of the first status word to change. The change in VM status would be aggregated and cascaded up to the host level resulting in a bit change in the first bit of the host status word 204.

Figure 3A:
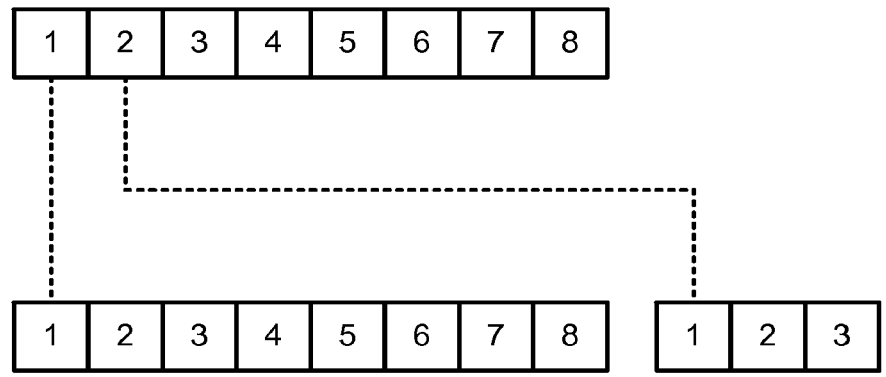
FIGS. 3A-3D show example expansion and contraction of multiple level variable-length dynamic bit-masked status words in accordance with at least one implementation.
Figure 3B:
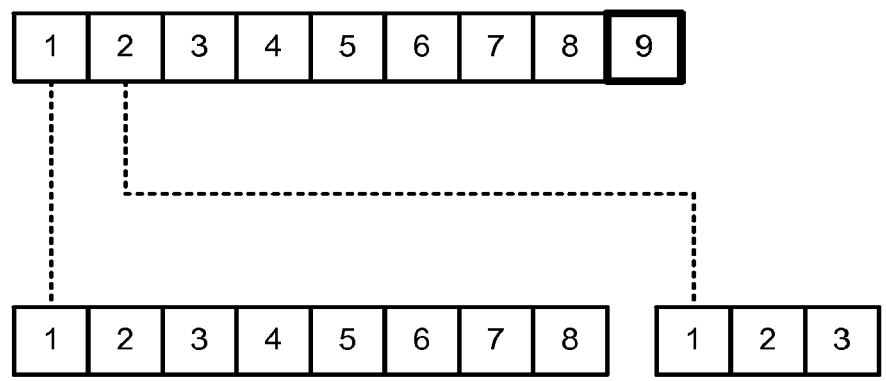

FIGS. 3A-3D are diagrams of example expansion and contraction of multiple level variable-length dynamic bit-masked status words in accordance with at least one implementation. In particular, FIG. 3A shows an initial example of two hierarchical levels of status words (e.g., hosts and VMs). In FIG. 3B, an attribute add notification was received to add a new host (shown in the ninth bit position). In operation, a management system (or an entity handling the status word for a particular level) can receive a change indication (e.g., add, remove or modify an entity) including information about the change (e.g., new entity structure and/or status, removed entity, or modified structure and/or status of an existing entity). Also, in some implementations, the change notification can be processed at a given level in the hierarchy and sent to a next higher level in the hierarchy to notify that level of the change. The bit masked status words at each appropriate level can be modified by the management system (or by an entity handling the status word for that level) to reflect the change notification and to conform the bit-masked status word hierarchy to the current structure/state of the virtualized system. Status bits representing added entities can be added by the management system (or by an entity handling the status word for that level) as needed to levels in the hierarchy corresponding to the entity type, logical location of the entity within the system and according to the logical relationship between the new entity and one or more other entities in the system. Similarly, removal of entities from the system can be reflected in the multiple level variable-length dynamic bit-masked status words by removal of status bit(s) and/or word(s) at each level where a bit or word represents the removed entity. Also, existing entity information can be changed according to a change notification, for example, an entity type, logical location, logical relationship and/or state value can be changed by the management system (or by an entity handling the status word for that level) according to a received notification. This ability to change an existing status word (e.g., expand or contract), add and remove status bit(s) and/or word(s) and change existing status bit(s) and/or word(s) provides the dynamic and variable-length attributes and capabilities discussed herein. The dynamic feature reflects an ability of an implementation to update the status hierarchy in response to changes in the virtualized system (e.g., as indication by received change notifications). The variable-length feature reflects an ability of an implementation to adjust a status word to reflect the addition or removal of one or more entities at the corresponding level of the virtualized system hierarchy.

Figure 3C:
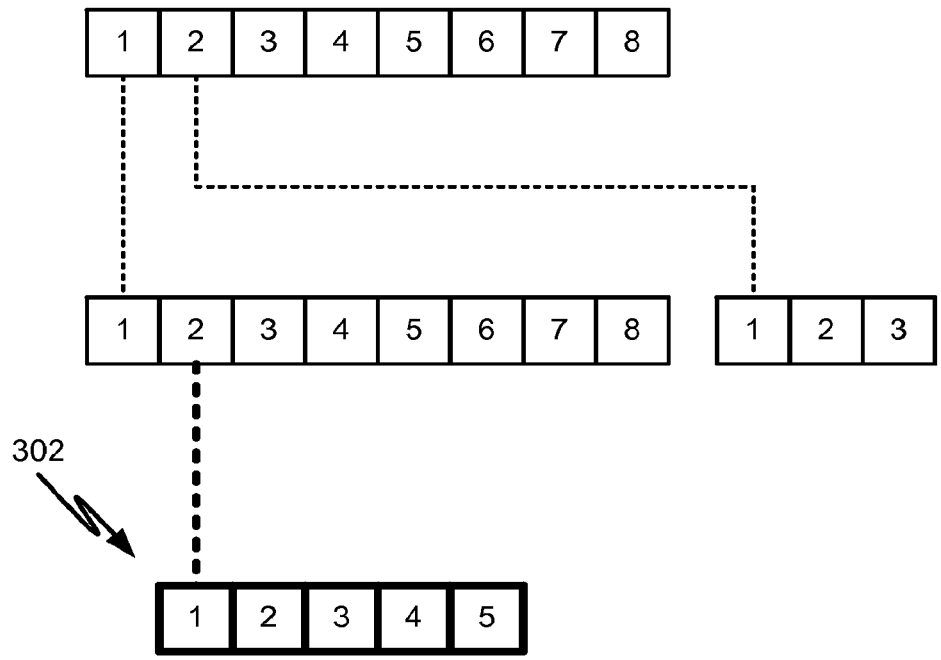
Figure 3D:
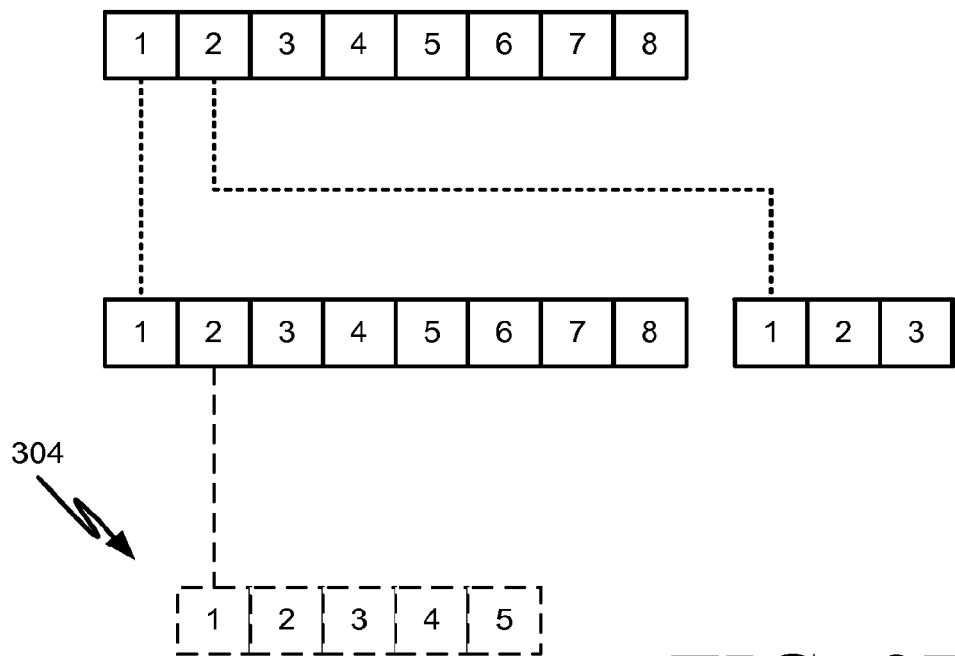

In FIG. 3C, the system has received a notification that an entirely new level of applications has been added and has updated the hierarchical structure accordingly by adding a new portion 302. In FIG. 3D, the system has received a notification that the applications added in FIG. 3C have been removed. Accordingly, the status word 304 in the hierarchical arrangement is removed by the management system (or by an entity handling the status word for that level) in response to a received change notification. The process of dynamically adding and removing bits and/or words in the status word hierarchy is permitted through the use of variable length bit masked status word structures. The status bit/word structures can be maintained by the management system (or by an entity handling the status bit/word structure for that level) so that the status word hierarchy essentially mirrors the structure and state of the virtualized system.

Figure 4:
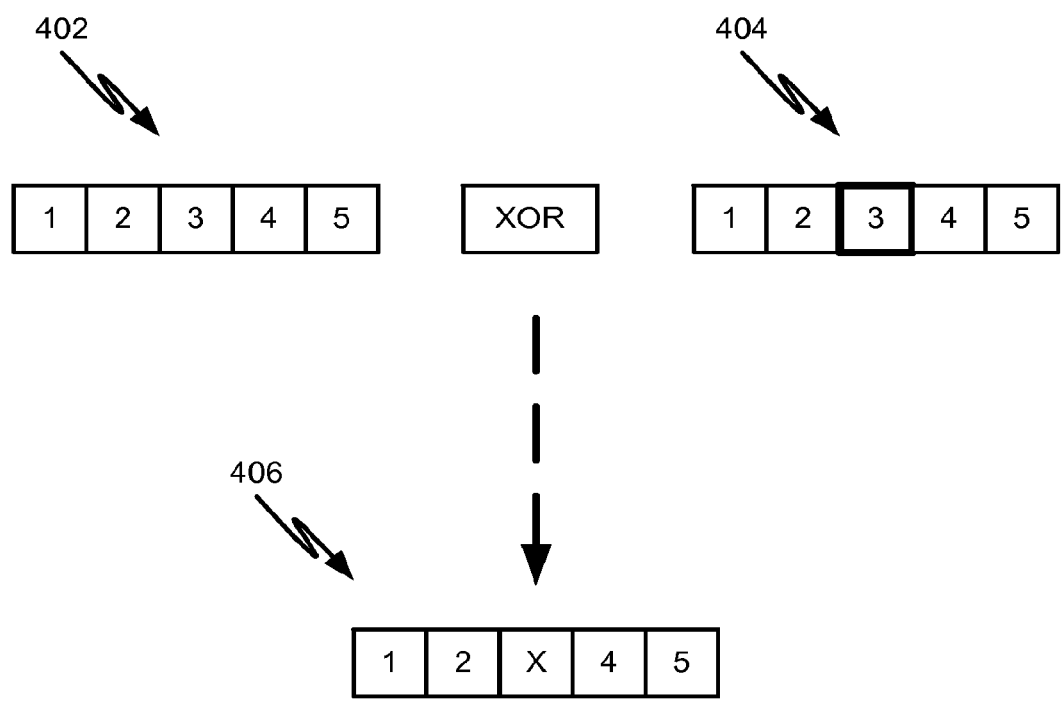
FIG. 4 is a diagram of an example exclusive OR (XOR) operation on bit-masked status words in accordance with at least one implementation.

FIG. 4 is a diagram of an example XOR operation on a bit-masked status word in accordance with at least one implementation. In particular, a status word stored at a management system 402 is exclusively OR'd with a status word received from a virtualized system 404. In this example, the third bit of the virtualized system status word has changed (e.g., assuming a system status word such as 202, the indication is that something has changed at the "App" level). The result of the XOR operation 406 will indicate to the management system that something has changed at the level corresponding to the third bit. Thus, with this method, a management system can determine the current overall status of a virtualized system by XORing the system-level status word, which represents the status (or health) of the entire system.

Figure 5:
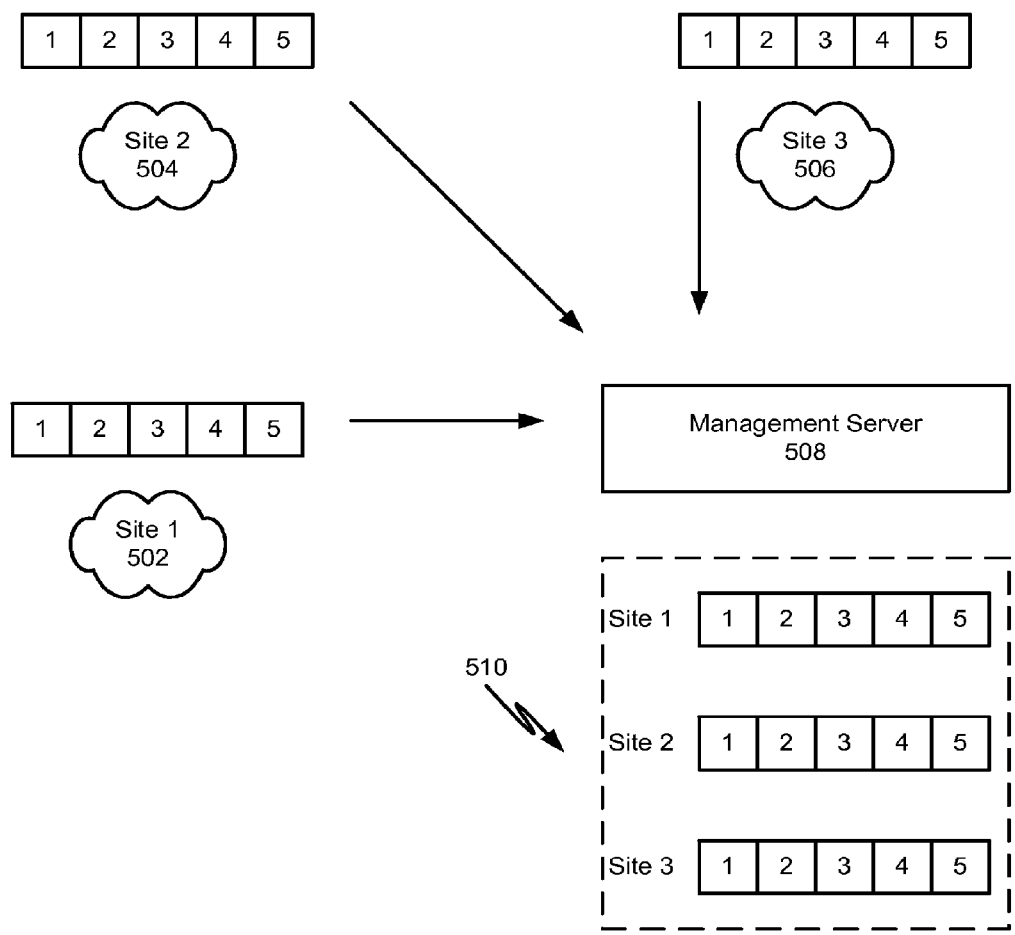
FIG. 5 is a diagram of an example multi-site deployment in accordance with at least one implementation.

FIG. 5 is a diagram of an example multi-site deployment in accordance with at least one implementation. In particular, FIG. 5 shows three sites (502, 504 and 506) which could be, for example, private/public cloud hosting application sites. Each of the three sites (502, 504 and 506) provide system-level status word to a management system 508, which maintains stored (and synched) copies of the previous status words 510. Each of the data center sites (502, 504 and 506) could have one or more datacenters, which can each have their own respective hierarchy.

Using the status word aggregating, cascading and querying described herein, the management system 508 can quickly determine the current overall status of all of the virtualized systems in a multi-site cloud deployment environment. The system-level status words can be provided to the management system (e.g., 102 and/or 508) via a heartbeat signal.

Figure 6:
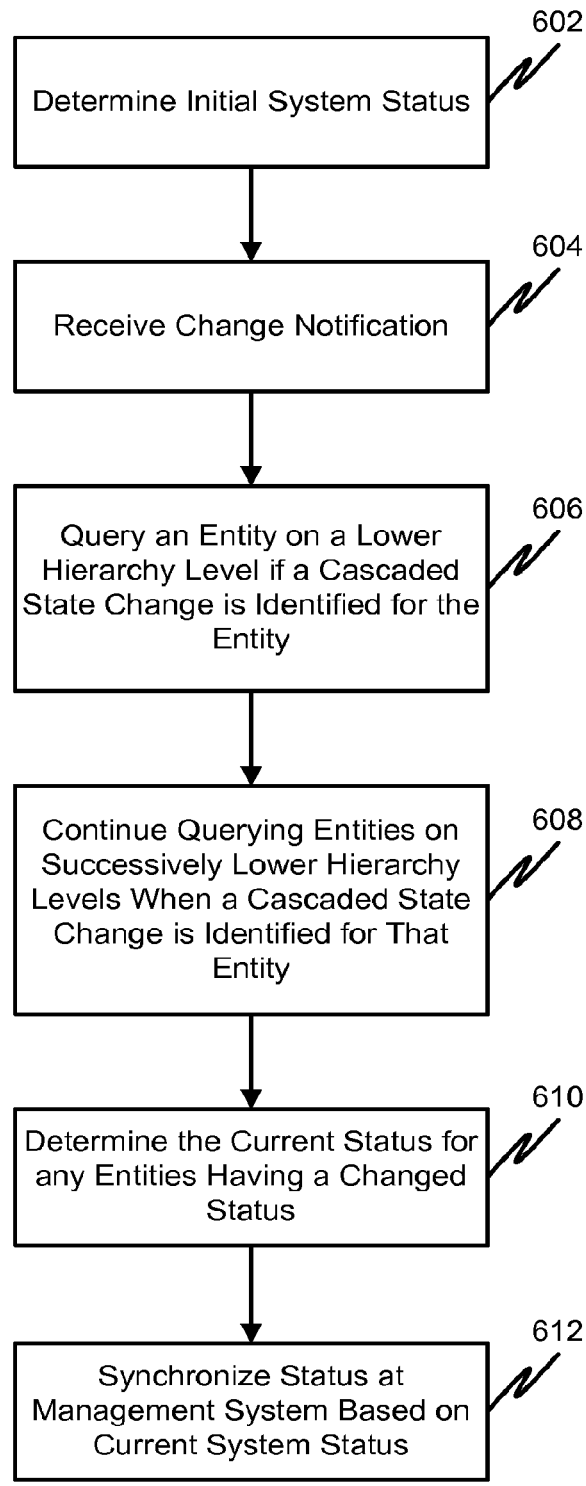
FIG. 6 is a flow chart of an example method for system synchronization using multiple level dynamic variable-length dynamic bit-masks in accordance with at least one implementation.

FIG. 6 is a flow chart of an example method for system synchronization using multiple level dynamic variable-length dynamic bit-masked status words in accordance with at least one implementation. Processing begins at 602, where an initial system status is determined. For example, a management system (e.g., 102 and/or 508) could query each entity in each level of a virtualized system hierarchy to determine an initial status and configuration of the virtualized system. Processing continues to 604.

At 604, one or more change notifications are received. The change notifications can include a bit masked status word received through a heartbeat signal, a bit masked status word "pushed" to the management system based on a change, or a bit masked status word provided in response to a query by the management system. Processing continues to 606.

At 606, the management system queries an entity on a lower level in the system hierarchy if a cascaded state change bit in the status word indicates that the entity has a state change. The querying can include requesting the status word of the entity at the lower level. Processing continues to 608.

At 608, the management system can continue querying entities on successively lower levels of the hierarchy when a cascaded state change is identified for each of the entities being queried. For example, the management system only queries the entities and levels for which a state change bit or word indicates a change has occurred. Thus, the management system avoids synchronizing the state of entities and/or levels that have not changed. Processing continues to 610.

At 610, when the management system reaches an entity that has a changed state, the management system can determine the current status (or state) for that entity and synchronize it with the status stored in the management system. It will be appreciated that other actions could be taken based on determining the entity status (e.g., displaying or transmitting a warning or an alarm, or the like). Processing continues to 612.

At 612, the status at the management system is synchronized with the current status of the virtualized system. It will be appreciated that 602-612 can be repeated in whole or in part in order to accomplish a contemplated state synchronization task.

Figure 7:
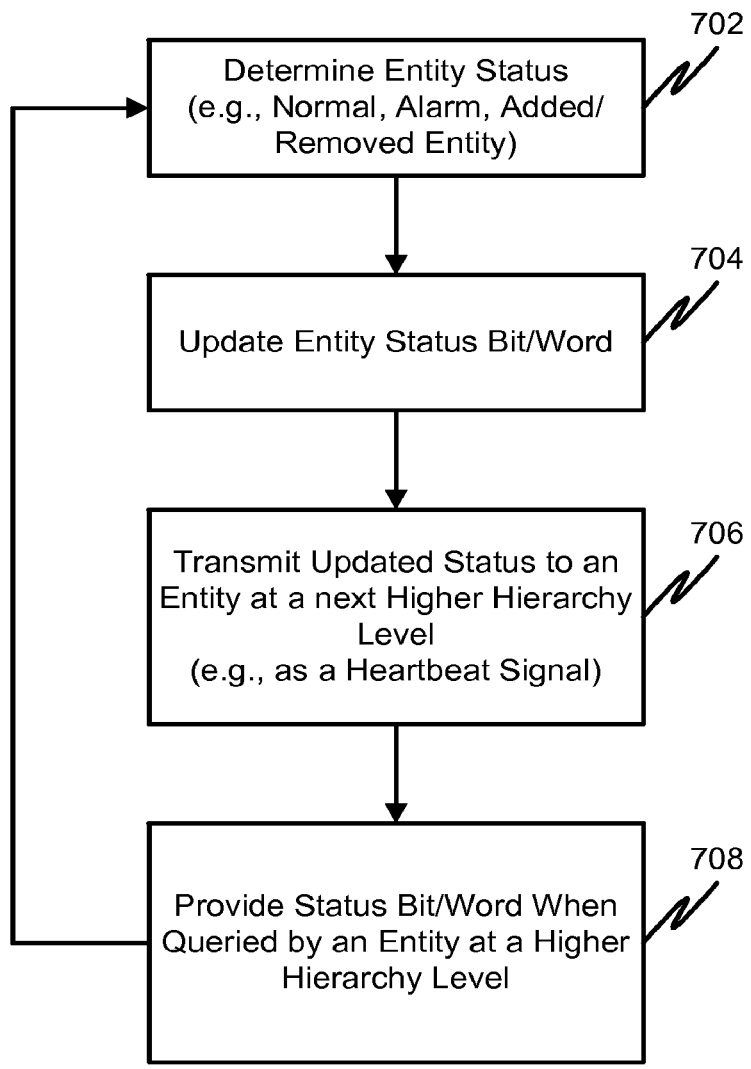
FIG. 7 is a flow chart of an example method for generating variable-length dynamic bit-masks in accordance with at least one implementation.

FIG. 7 is a flow chart of an example method for generating variable-length dynamic bit-masked status words in accordance with at least one implementation. Processing begins at 702, where an entity status is determined. For example, the entity status could be "normal", alarm condition, or indicate an added/removed entity. Processing continues to 704.

At 704, the entity status bit (or word) is updated to reflect the determined state (or status). Processing continues to 706.

At 706, the updated stat is provided (or transmitted) to a next higher hierarchy level. For example, the current state can be provided as part of a heartbeat signal. Processing continues to 708.

At 708, the entity can provide a status bit (or word) when queried by an entity at a higher hierarchy level or by the management system. It will be appreciated that 702-708 can be repeated in whole or in part in order to accomplish a contemplated state synchronization task.

Figure 8:
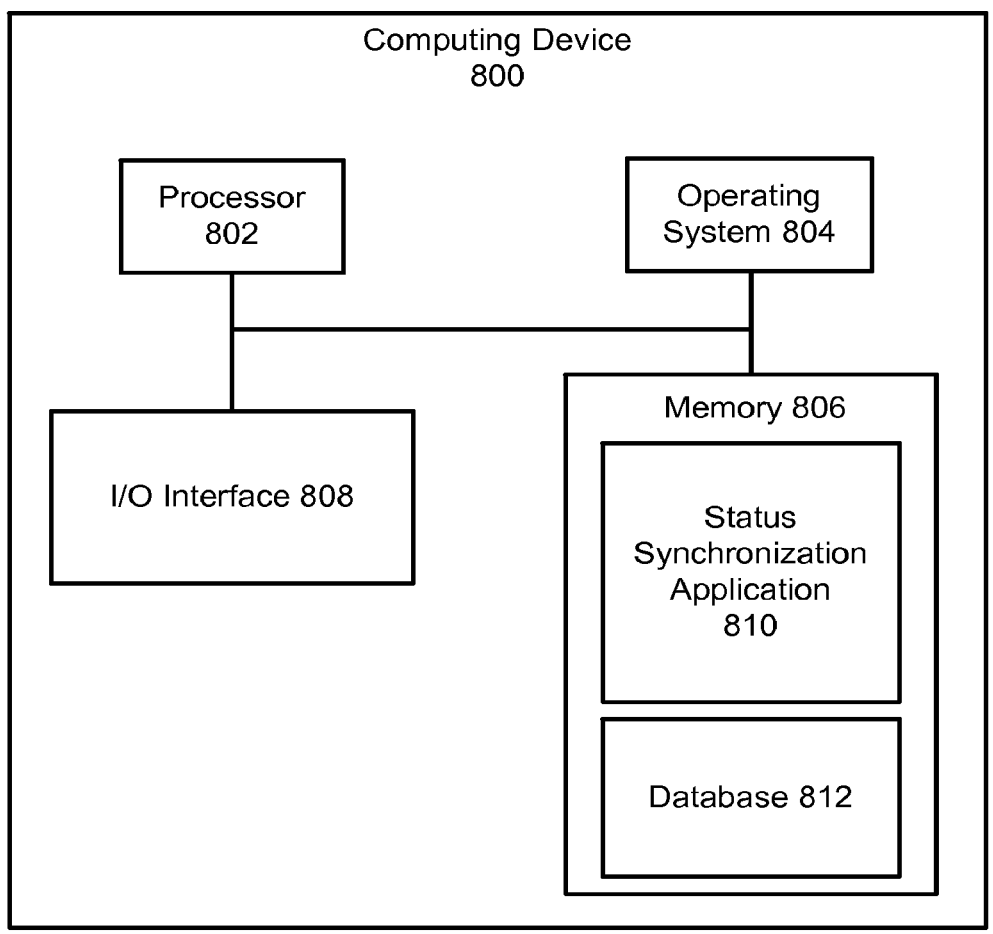
FIG. 8 is a diagram of an example computer system for synchronization using multiple level dynamic variable-length dynamic bit-masked words in accordance with at least one implementation.

FIG. 8 is a diagram of an example computer system 800 (e.g., a network management system or other sub-system in a network or the like) in accordance with at least one implementation. The computer 800 includes a processor 802, operating system 804, memory 806 and I/O interface 808. The memory 806 can include an application configured to perform system synchronization using multiple level dynamic variable-length dynamic bit-masks 810 ("synchronization application") and a database 812 (e.g., for storing status bit-masks or the like).

In operation, the processor 802 may execute the synchronization application 810 stored in the memory 806. The application 810 can include software instructions that, when executed by the processor, cause the processor to perform operations for synchronization using multiple level dynamic variable-length dynamic bit-masks in accordance with the present disclosure (e.g., performing one or more of steps 602-612 and/or 702-708).

The application program 810 can operate in conjunction with the database 812 and the operating system 804.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (e.g., software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for efficient state change support for hierarchical data models in a virtualized system.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   determining a system status including a system-level bit masked word having a plurality of bits, each bit corresponding to a status of a different hierarchical level of the system, wherein determining the system status includes determining an entity status for one or more entities;
   receiving one or more updated entity status words from an entity at a lower hierarchy level, wherein the one or more updated entity status words are received as part of a heartbeat signal from the entity at the lower hierarchy level;
   querying one or more entities in successively lower hierarchy levels so long as a cascaded state change is identified for a corresponding entity in a lower hierarchy level; and
   determining the current status for one or more entities having a changed status,
   wherein identifying a cascaded state change includes performing a logical exclusive OR operation on a previous status bit masked word and a current status bit masked word of an entity.

2. The method of claim 1, wherein the system status includes a plurality of system-level bit masked words each word corresponding to a different system.

3. The method of claim 1, further comprising receiving a change notification including querying the system-level bit masked word.

4. The method of claim 1, further comprising receiving a change notification including receiving an indication of one of a new entity in the system or a removed entity in the system.

5. The method of claim 1, further comprising receiving a change notification including receiving a new value of an existing entity.

6. The method of claim 1, further comprising receiving a change notification including receiving an indication of an alarm in an entity in the system.

7. The method of claim 1, wherein the previous status bit masked word is stored in a management system and the current status bit masked word is received from a virtualized system.

\* \* \* \* \*